Figure 1:
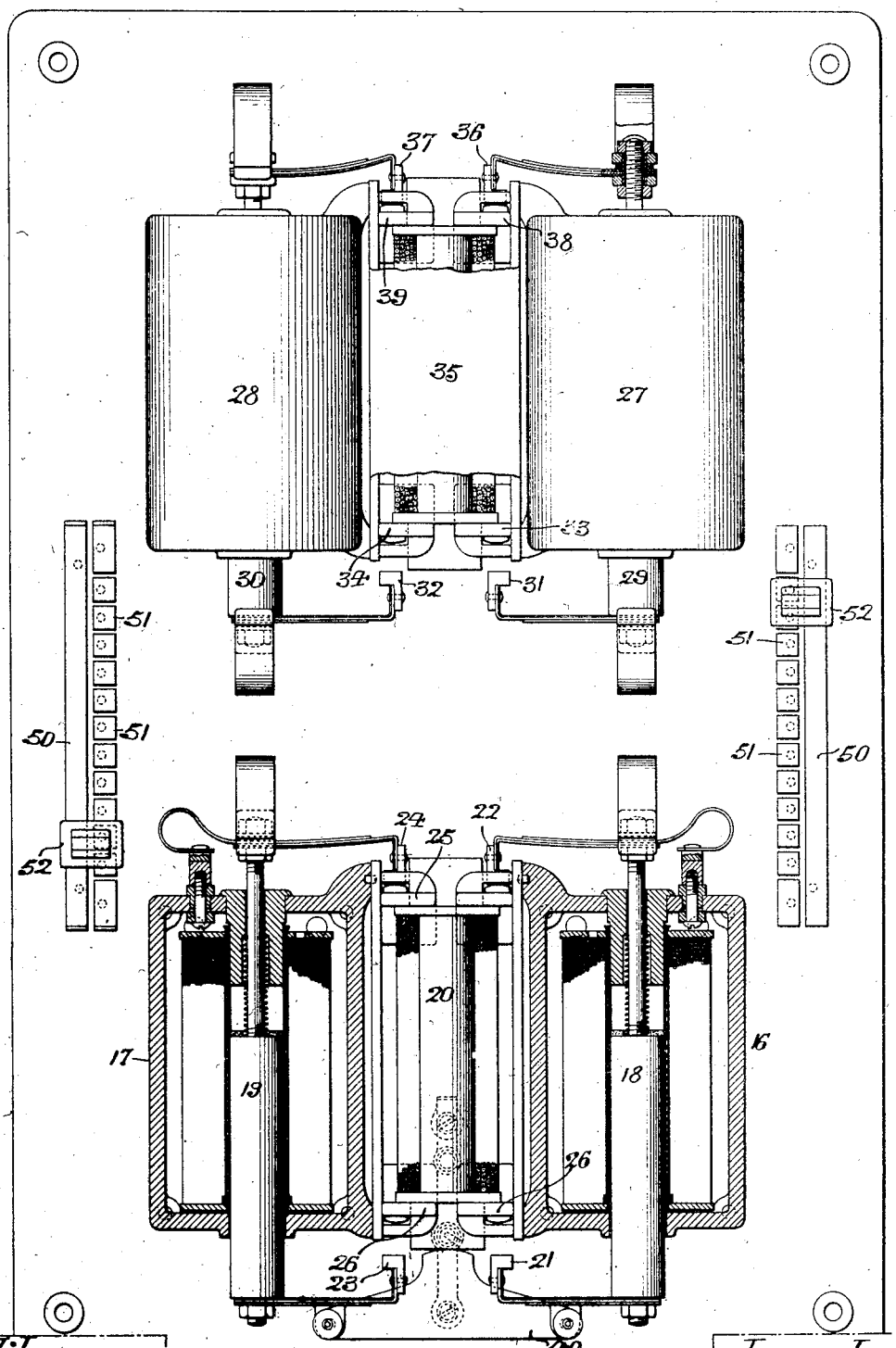

S. H. KEEFER.
SYSTEM OF MOTOR CONTROL.
APPLICATION FILED NOV. 8, 1909.

967,133.

Patented Aug. 9, 1910.

5 SHEETS—SHEET 1.

Witnesses:
William H. Rivoir.
Willa A. Burrows

Inventor.—
Samuel H. Keefer.
by his Attorneys.
Howson & Howson

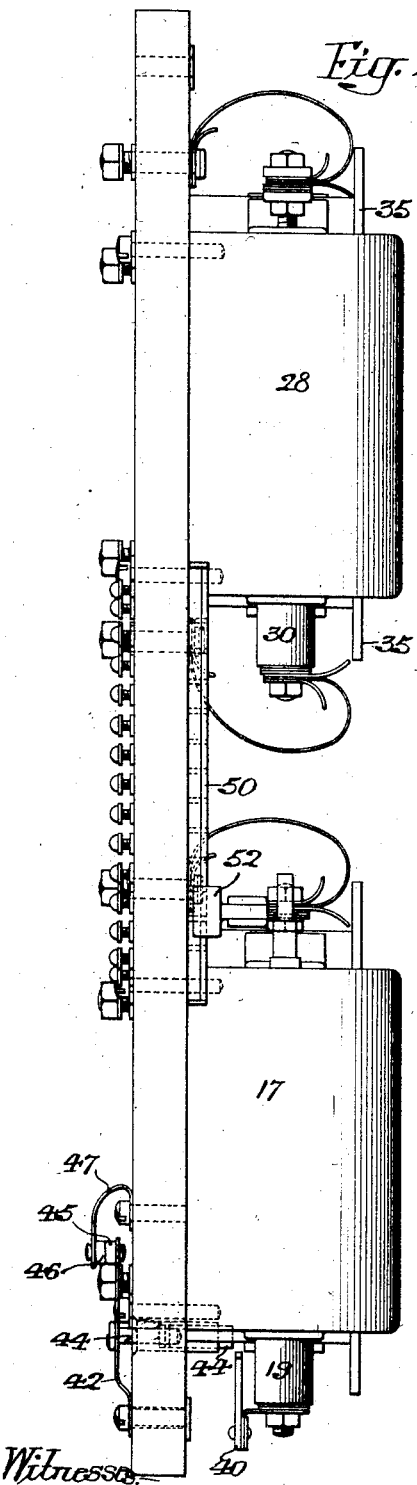
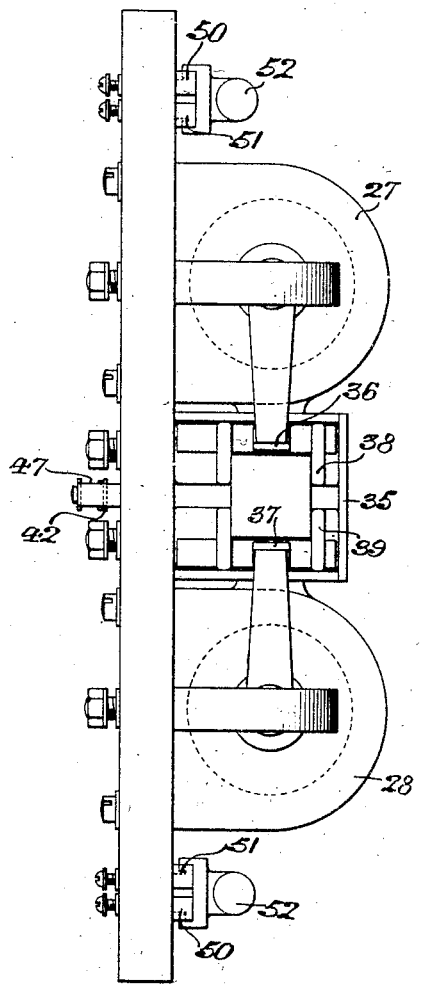

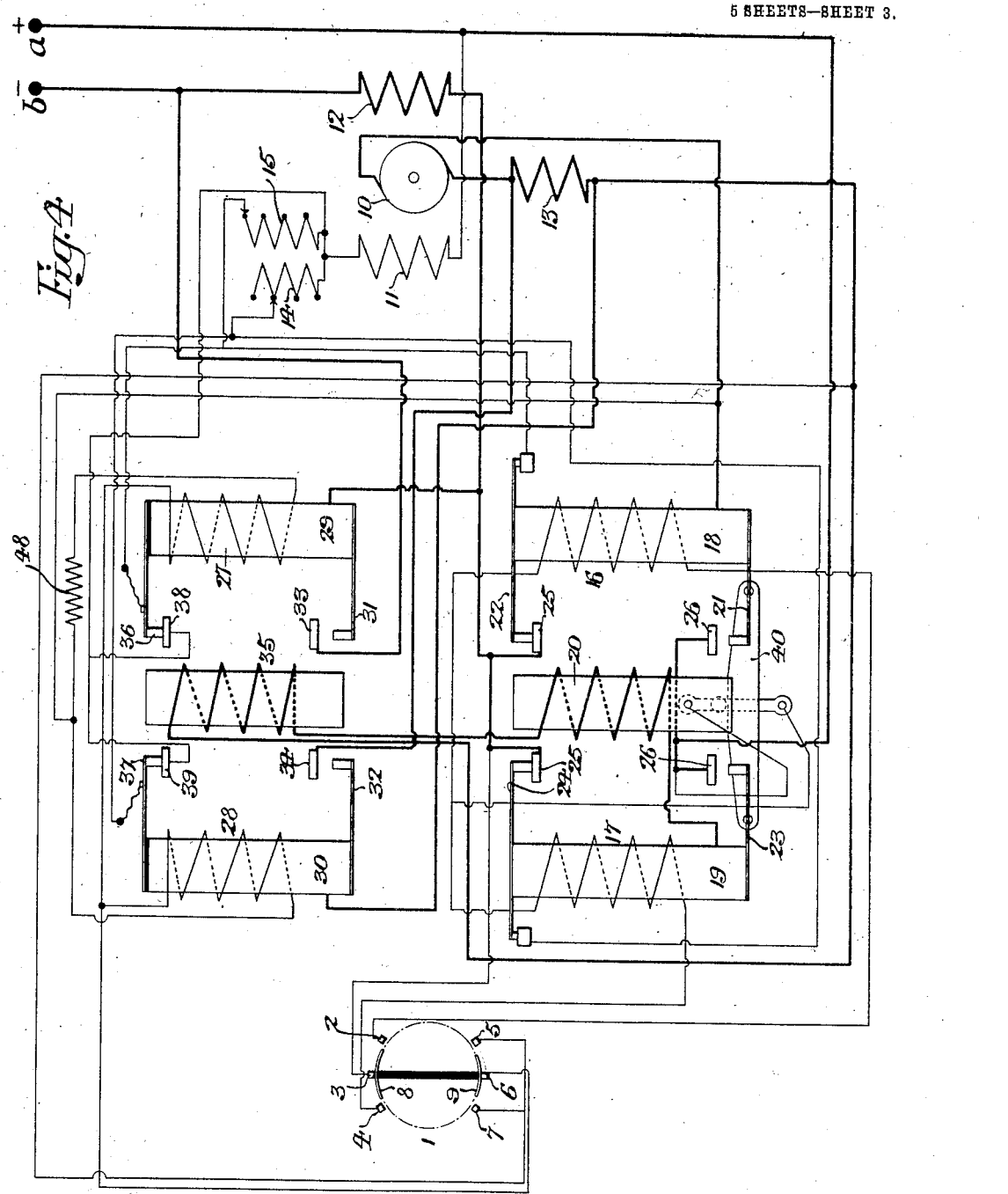

S. H. KEEFER.
SYSTEM OF MOTOR CONTROL.
APPLICATION FILED NOV. 8, 1909.
967,133.
Patented Aug. 9, 1910.
5 SHEETS—SHEET 4.
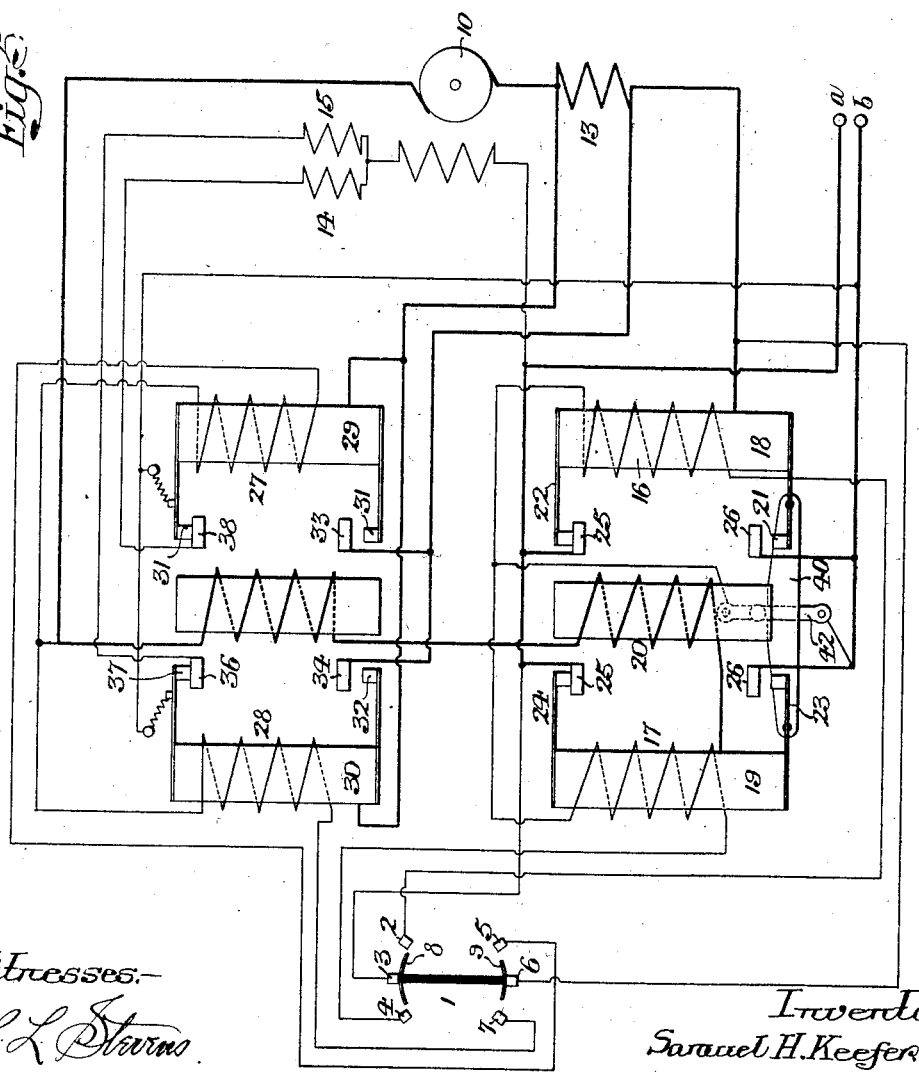

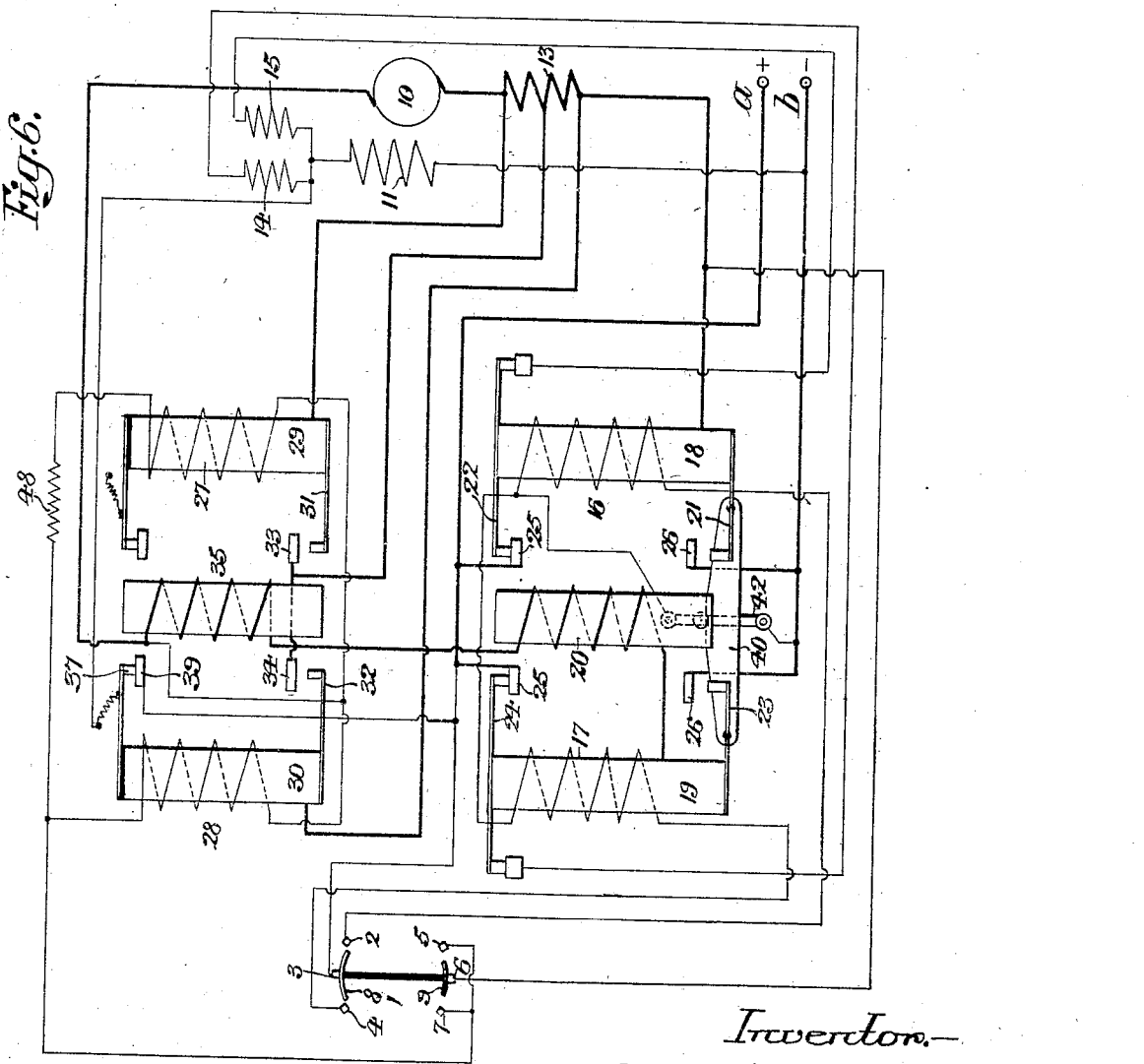

UNITED STATES PATENT OFFICE.

SAMUEL H. KEEFER, OF PLAINFIELD, NEW JERSEY, ASSIGNOR TO NILES-BEMENT-POND COMPANY, OF JERSEY CITY, NEW JERSEY, A CORPORATION OF NEW JERSEY.

SYSTEM OF MOTOR CONTROL.

967,133.      Specification of Letters Patent.      Patented Aug. 9, 1910.

Application filed November 8, 1909. Serial No. 526,931.

*To all whom it may concern:*

Be it known that I, SAMUEL H. KEEFER, a citizen of the United States, residing in Plainfield, New Jersey, have invented certain Improvements in Systems of Motor Control, of which the following is a specification.

My invention relates to that class of motor controlling systems in which the starting of the motor is accomplished by the successive closure of a number of switches whereby the amount of resistance in circuit with the field, armature, or both of these elements is varied; the switches themselves being controlled by a pilot switch.

One object of the invention is to provide such a system as that indicated, with means whereby it shall be impossible to cause closing of the main switch so as to deliver current to the motor, before its speed and hence its counter E. M. F., have fallen to a predetermined low point.

I further desire to provide a system including apparatus for controlling the starting and reversal of an electric motor and means whereby after the current supply has been cut off from the motor, the latter is short circuited on itself, in combination with a device for preventing flow of current from the supply mains to the motor, in order to drive it in an opposite direction, until the flow of current in its armature circuit has fallen to a predetermined low point.

I also desire to provide a system of motor control of the class above indicated, with improved means for causing successive action of certain of the starting or controlling switches.

These objects and other advantageous ends I secure as hereinafter set forth, reference being had to the accompanying drawings, in which:—

Figure 1, is a front elevation of the switches and their coöperating mechanism forming part of my invention; Figs. 2 and 3 are respectively a side elevation and a plan of the apparatus shown in Fig. 1; Figs. 4, 5 and 6 are diagrammatic views showing the electrical connections of the apparatus comprising my system and, Fig. 7, is a diagrammatic view illustrating the arrangement of parts for preventing operation of the main switches until the current in the armature circuit has fallen to a predetermined point.

In Fig. 4, of the above drawings, 1 is a pilot switch having two sets of fixed contacts, 2, 3, 4 and 5, 6, 7, so arranged that either of the contacts 2 and 4 or 5 and 7 may be electrically connected to the contacts 3 and 6 respectively, by segmental plates 8 and 9, which are movable into and out of engagement with them in the well known manner.

The motor to be controlled has an armature 10, a shunt field winding 11, and a series field winding 12;—there being also a body of armature resistance 13 and two bodies 14 and 15 of field resistance. For controlling the direction of rotation of the motor, I provide a reversing switch consisting of two solenoids 16 and 17 which have movable cores 18 and 19, as well as a blow out magnet 20 common to both of them. The core 18 has two spring contacts 21 and 22 carried by or connected to its opposite ends. Similarly the core 19 carries at its opposite ends two spring contacts 23 and 24, and the latter of these, as well as the contact 22, is capable of engaging a metallic ring or plate 25 mounted within the field of the blow out magnet 20, when the two cores 18 and 19 are in their lowermost positions corresponding to a deënergized condition of the solenoids. The two contacts 21 and 23 are capable of engaging a metallic plate 26 when the solenoids are energized sufficiently to raise the two cores 18 and 19, and this plate, like the plate 25, lies within the magnetic field of the blow out magnet 20.

In addition to the reversing solenoids 16 and 17, I provide two other solenoids 27 and 28 respectively having cores 29 and 30. The first of said cores carries on its lower end a spring supported contact 31 and the second one similarly carries a contact 32, both of which are capable of engaging contact plates 33 and 34 mounted to lie within the magnetic field of a blow out magnet 35, though electrically independent of each other. The upper ends of the two cores respectively carry spring mounted contacts 36 and 37, which are electrically insulated from them and are designed to coöperate with fixed contacts 38 and 39 mounted within the magnetic field of the blow out magnet 35. Unlike these two last contacts, the contacts 21, 23, 31 and 32 are all in electrical connection with the cores to which they are attached, and the design of the parts is such that when the solenoids 27 and 28 are deënergized, the contacts 36 and 37 engage their fixed contacts 38 and 39, while the contacts 31 and 32 are out of engagement with their fixed contacts 33 and 34. These two latter pairs respectively engage each other only when their solenoids are energized. Similarly the contacts 22 and 24 engage the plate or ring 25 when the solenoids 16 and 17 are deënergized, while when current is supplied to said solenoids, the contacts 21 and 23 engage the plate or ring 26.

From Figs. 1, 2 and 7, it will be noted that the fiber plate 40 is pivotally connected at its two ends to the spring arms which carry the two contacts 21 and 23 of the solenoids 16 and 17, so that when either of the cores 18 or 19 is raised by energization of its solenoid, this fiber plate is raised upwardly immediately to the rear of the core of the blow out magnet 20. Upon the back of the marble or slate slab 41 on which the controlling apparatus is mounted, I place a spring 42 to which is connected an armature 44 extending through said slab directly toward the core of said magnet 20. The end of said armature immediately adjacent said core is of soft iron or other magnetic material, and the arrangement is such that when the blow out magnet is energized, this armature is bodily moved toward it against the action of the spring 42, unless hindered by the fiber plate 40 being raised by one of the solenoid cores 18 or 19. This same spring 42 also carries at its upper end a contact plate or button 45 designed to coact with a similar contact 46 carried on a spring arm 47;—the arrangement being such that under normal conditions these two contacts are in electrical engagement. When, however, the armature 44 is moved toward the core of the blow out magnet 20 under such conditions that the fiber plate 40 is in its lower position, the circuit between these two contacts is broken.

The switch formed by the two contacts 45 and 46 is connected between one of the current supply mains and the windings of the two solenoids 16 and 17, so as to render impossible the energization of these latter unless said switch is closed. The said windings are capable of being connected to this current supply main through the contacts 2 and 4 of the pilot switch by the proper movement of the segment 8, and the windings of the solenoids 27 and 28 are connected in shunt to the armature 10 of the motor, although they likewise pass through the pilot switch 1. Said latter windings are themselves connected in parallel and in order that they may cause successive action of the switches which they control, I connect in circuit with one of them, in the present instance, the winding of the solenoid 27, a body of resistance 48 (Fig. 4), which so cuts down the current flow to said solenoid that before it can raise its core it is necessary for the counter E. M. F. of the armature to rise to a point higher than that necessary to cause operation of the solenoid 28.

With the above described apparatus and connections, if current be supplied to the mains $a$ and $b$ and the pilot switch be so operated that the segment 8 connects the contacts 2 and 3 and the segment 9 connects the contacts 6 and 7, current will flow from the main $a$ through the switch formed by the contacts 45 and 46, winding of the solenoid 16, contact 2, segment 8, contact 3, and through the series field winding of the motor, to the main $b$. Said solenoid 16 is therefore energized, so that it raises its core 18, breaking the connection between the contacts 22 and 25 and closing that between the contacts 21 and 26; it being noted that as soon as current flows to the mains $a$ and $b$, the shunt field of the motor is supplied with current flowing from the main $a$ to the shunt field winding, through either set of contacts 37 and 39, or 36 and 38, the contacts 22 and 24 in parallel, plate 25, and series field, to the main $b$. Hence the motor starts, as soon as the contact 21 engages the contact 26, the current flowing from the main $a$ through said contacts 26 and 21 to the core 18, armature 10, armature resistance 13, blow out magnets 35 and 20, core 19, contacts 24 and 25, through the series field winding 12, and to the negative main $b$.

Since the core of the blow out magnet is energized it tends to attract the armature 44 and open the switch formed by the contacts 45 and 46, but such action is prevented by the fiber plate 40 which is raised by the core 18 so as to be interposed between the core of the magnet 20 and the end of the armature.

Since the segment 9 of the pilot switch connects the contacts 6 and 7 thereof, the two solenoids 27 and 28 are energized and raise their cores as soon as the counter E. M. F. of the armature 10 rises to a predetermined point. Because of the resistance 48 in series with the winding of the solenoid 27, the solenoid 28 first raises its core 30, thereby connecting the contacts 32 and 34 and separating the contacts 37 and 39. This latter action breaks the short circuit around the field resistance 14 and 15, and since the contacts 22 and 25 are already separated, causes the current passing through the shunt field of the motor to flow through the resistance 14, the contacts 24 and 25 and series field winding, to the negative main $b$, which necessarily causes the shunt field current to be cut down and the motor to be correspondingly speeded up. The engagement of the contacts 32 and 34 causes the armature resistance 13 to be short circuited, since the current, after passing through the armature, flows to the contact 34, thence to the contact 32, core 30, and blow out magnet 35, etc., thus still further speeding up the motor. The counter E. M. F. of the motor is thus increased and the solenoid 27 caused to raise its core 29, thereby separating the contacts 36 and 38 and causing engagement of the contacts 31 and 33. The first of these operations does not affect the shunt field circuit of the motor, although the latter of them short circuits the series field winding 12, thus further weakening the motor field and giving the machine its highest speed. If now the pilot switch be moved to its off position as shown in the drawing, the circuits of the various solenoids are broken and their cores fall to the positions shown in Fig. 4. The motor therefore acts as a generator, since its shunt field is still excited and its armature is short circuited on itself; the current flowing from said armature to the core 18 through contacts 22, 25 and 24, core 19, blow out magnets 20 and 35, armature resistance 13, and back to said armature. There is thus produced a braking effect which shortly brings the motor to rest. If instead of being left in its off position, the pilot switch be immediately moved to such position as would cause rotation of the armature in a direction opposite to that which it first had, it is obvious that the motor would be seriously injured if current at once flowed to it from the supply mains. By the apparatus above described, however, such an action is effectually prevented, for as soon as the motor generates current, this flows through the winding of the blow out magnet 20, so that the iron end of the armature carried by the spring arm 42 is drawn toward the core of said magnet and held there as long as current above the certain predetermined amount flows in the armature circuit. As long as this armature remains in its inner position against the action of the spring arm 42, the contacts 45 and 46 are separated, and the circuits of the windings of the solenoids 16 and 17 are opened so that with the pilot switch in its on position, neither of these solenoids can be energized until the current flowing through the armature circuit falls to a predetermined point. When this point is reached the magnetic flux of the blow out magnet 20 falls sufficiently to release the armature 44, thereby permitting the contacts 45 and 46 to again engage each other and thus complete the circuit of both of the solenoids 16 and 17, except in so far as these may be broken at the pilot switch.

If the pilot switch be moved to connect the contacts 3 and 4, and 5 and 6 respectively, the solenoid 17 is energized so that current is delivered to the armature 10 in a direction opposite that in which it flows when the solenoid 16 is energized, and the direction of current flow in the field windings remains unchanged, so that the direction of rotation of the armature is reversed. Thereafter the solenoids 29 and 27 are successively energized as before, although in this instance the field resistance 15 is in circuit with the shunt field winding 11, in order that the speed of the motor may be made to be different for its two directions of rotation. For purposes of adjusting these banks of resistance I provide each of them, Fig. 1, with a contact strip 50, a number of contact buttons 51 connected to various points on the field resistance, and an adjustable slider 52 capable of connecting any of said buttons with said strip.

While in Fig. 4, I have shown my system as employed in connection with a compound wound motor, it may be used with equal advantage for the control of a shunt wound motor such as that shown in Figs. 5 and 6. In this case the solenoids 16 and 17 with the contacts constituting the reversing switch, are arranged in a manner very similar to that shown in Fig. 4, and after the motor has started, the increasing counter E. M. F. of the armature energizes but one of the solenoids 27 or 28, depending upon which of the contacts 5 or 7 of the pilot switch is connected to the contact 6. Assuming the latter to be the case, the solenoid 28 is energized and the engagement of the contact 32 with the contact 34 causes the short circuiting of the armature resistance 13, after the separation of the contacts 36 and 37 has weakened the field by cutting out the resistance 15. The motor is thus brought up to full speed by two steps, and as before, the introduction of current to it by a quick throwing of the pilot switch from one "on" position to the other, is prevented by the separation of the contacts 45 and 46 as before described, until the counter E. M. F. of the motor has fallen to the desired predetermined safe point. In this case, as well as in that shown in Fig. 4, the contacts 45 and 46, Fig. 7, are prevented from separating under normal operating conditions, by reason of the fact that by the raising of either of the cores 18 or 19, the fiber plate 40 is introduced between the blow out magnet core 20 and the end of the armature. When the pilot switch is moved to reverse the direction of rotation of the motor, the solenoid 17 is energized to start the same and subsequently the solenoid 27 draws up its core to cut out the field resistance 14.

In that form of the system shown in Fig. 6, the reverse solenoids 16 and 17 are connected as previously described, and the solenoids 27 and 28 have their windings so connected that they are successively energized as the counter E. M. F. of the armature rises;—there being provided a body of resistance 48, as previously noted, for causing such action. When the motor starts, the strength of its shunt field is at a maximum since the current flows from the positive main through the contacts 39 and 37 and through the shunt field to the negative main. The separation of the contacts 37 and 39 breaks the short circuit around the field resistance 14 and 15 and automatically places one of said banks of said resistance in series with the shunt field 11. Immediately thereafter a portion of the armature resistance is short circuited and the subsequent energization of the solenoid 27 acts to cut out the balance of the armature resistance, thus bringing the motor up to full speed.

By means of the device above described, I am enabled to prevent injury to the motor, even though the pilot switch be operated from one position to the other with great rapidity, since in every instance it is absolutely necessary that the counter E. M. F. of the motor armature shall fall to the predetermined point before current can again be delivered to it to cause a reversal of its direction of rotation. By the introduction of the resistance 48 into the circuit of solenoids connected in shunt to the armature of the motor, I cause one of them to raise its core before the other, thereby providing a relatively simple means for securing the successive action of two or any number of solenoids.

I claim:—

1. The combination in a motor controlling system of an electro-magnetically actuated reversing switch for the motor; a blow-out magnet for the switch; a pilot switch for controlling said reversing switch; and means controlled by the blow-out magnet for preventing operation of the reversing switch to reverse the direction of rotation of the motor until the counter E. M. F. of said motor falls to a predetermined point.

2. The combination in a motor controlling system of a motor; an electro-magnetically controlled reversing switch; a switch for controlling the operation of said reversing switch; said second switch being constructed to tend to open whenever current flows through the motor; with mechanical means for preventing opening of said latter switch except when the motor is generating current.

3. The combination in a motor controlling system of a reversing switch consisting of a plurality of solenoids having contacts in circuit with the motor; a pilot switch for controlling the energization of said solenoids; and a switch in circuit with said windings having means for maintaining it in an open condition when the motor is short circuited until the counter E. M. F. of said motor has fallen to a predetermined point; said means including a winding connected to receive current whenever the motor is in operation.

4. The combination in a motor controlling system of a reversing switch consisting of a plurality of solenoids having contacts in circuit with the motor; a pilot switch for controlling the energization of said solenoids; and a switch in circuit with said windings, having means for maintaining it in an open condition when the motor is short circuited until the counter E. M. F. of said motor has fallen to a predetermined point; with means for positively and forcibly preventing the opening of said latter switch when the motor is receiving current from the supply mains.

5. The combination in a motor controlling system of a reversing switch including a solenoid and contacts controlled thereby; a pilot switch for controlling the energization of said solenoid; a switch in circuit with said solenoid; electro-magnetically operated means for actuating said latter switch when the motor is short circuited; and means for holding of the switch in its closed position when the motor is receiving current from the supply mains.

6. The combination in a motor controlling system of a reversing switch consisting of a plurality of solenoids having contacts; a blow out magnet for said solenoids; a pilot switch for controlling the energization of the solenoids; with a switch in circuit with the windings of the solenoids and controlled by said blow out magnet, for maintaining said reversing switch in an open condition as long as the counter E. M. F. of the motor remains above a predetermined point and said motor is short circuited.

7. The combination in a motor controlling system of a reversing switch consisting of a plurality of solenoids having contacts; a blow out magnet for said solenoids; a pilot switch for controlling the energization of the solenoids; and a switch in circuit with the windings of the solenoids and controlled by said blow out magnet for maintaining said switch in an open condition as long as the counter E. M. F. of the motor remains above a predetermined point and the motor is short circuited; with a device for maintaining said switch closed in spite of the blow out magnet when the motor is receiving current from the supply mains.

8. The combination in a motor controlling system of a reversing switch consisting of a plurality of solenoids having contacts; a blow out magnet for said solenoids; a pilot switch for controlling the energization of the solenoids; and a switch in circuit with the windings of the solenoids and controlled by said blow out magnet for maintaining said switch in an open condition as long as the counter E. M. F. of the motor remains above a predetermined point and the motor is short circuited; with a device for maintaining said switch closed in spite of the blow out magnet when either of the solenoids is energized.

9. The combination in a motor controlling system of two solenoids; a series of contacts controlled thereby; a member also controlled by the movable elements of said solenoids; a blow out magnet for said contacts; a pilot switch for controlling the energization of the solenoids; and a switch actuated by the flux of the blow out magnet and in circuit with the windings of the solenoids, said switch being placed to be held closed under predetermined conditions, against the action of said magnetic flux, by the solenoid-controlled member.

10. The combination of a supporting structure; two solenoids mounted thereon and provided with a series of contacts; a blow out magnet for said contacts; a switch having a movable member placed to be acted on by said blow out magnet; a plate of insulating material attached to the movable elements of the solenoids and capable of being moved by either of them into position to prevent opening of said switch; and a pilot switch in circuit with the solenoid windings.

11. The combination in a motor controlling system of a reversing switch including two solenoids; a blow out magnet mounted between said solenoids; contacts controlled by the solenoids; a plunger including magnetic material mounted within the field of the blow out magnet; a switch controlled by said plunger and in circuit with the windings of said solenoids; with a member connected to the cores of the solenoids and capable of being moved by either of them into position to prevent movement of the switch-controlling plunger.

12. A motor controlling system including a pair of solenoids; means for controlling the energization of the solenoids; a switch in circuit with said solenoids; contacts governed by the solenoids; a blow-out magnet for said contacts; and a device for preventing closure of said switch until the magnetic flux of the blow out magnet has fallen to a predetermined point after the deënergization of one of the solenoids.

13. A motor controlling system including two solenoids; a pilot switch connected to the windings of said solenoids; contacts controlled by said solenoids; and electromagnetic means controlled by the motor including a winding in circuit with the motor; a switch controlled thereby; and a device for preventing closure of the switch except when the motor is generating current, for preventing actuation of the solenoid contacts after current has been cut off from the motor armature until the counter E. M. F. of said motor has fallen to a predetermined point.

In testimony whereof, I have signed my name to this specification, in the presence of two subscribing witnesses.

SAMUEL H. KEEFER.

Witnesses:
WILLIAM E. BRADLEY,
WM. A. BARR.